Oct. 28, 1958     J. A. HASTINGS     2,857,808
MICROMANIPULATOR Filed Feb. 5, 1954     5 Sheets-Sheet 1

Tool supports are controled by heated wires as shown in fig 4

Fig. 1

Magnetic tool holder 84

INVENTOR
JOHN A. HASTINGS
BY Louis L. Gagnon
Noble D. Williams
ATTORNEYS

Oct. 28, 1958    J. A. HASTINGS    2,857,808
MICROMANIPULATOR
Filed Feb. 5, 1954    5 Sheets-Sheet 5

INVENTOR
JOHN A. HASTINGS
BY
ATTORNEYS

United States Patent Office 2,857,808
Patented Oct. 28, 1958

2,857,808

MICROMANIPULATOR

John A. Hastings, Bass River, Mass.

Application February 5, 1954, Serial No. 408,395

16 Claims. (Cl. 88—40)

This invention relates to improvements in micromanipulators and has particular reference to improved devices of this character for use with microscopes and similar optical instruments for rapidly and accurately positioning, moving and controlling micromanipulator tools relative to microscopic bodies within the object field of a microscope or like instrument during use thereof.

One of the principal objects of the present invention is to provide an improved electrically operated micromanipulator or the like which provides rapid and precise normalized three-dimensional control of the movement of one or several micromanipulator tools while being viewed under a microscope or the like.

Another object of the present invention is the provision of a micromanipulator of the character described which may be controlled easily and which responds rapidly and thus is suitable for precise microbiological, microphysical and like investigations, such functioning being by reason of thermal expansion of electrically heated fine wires.

Another object is the provision of a micromanipulator for use with a microscope or equivalent optical instrument and which micromanipulator embodies one or a plurality of micro-tools which are carried by movable tool supports suspended on spring-loaded electrically conductive expansion wires in respective manipulator heads, the said micro-tools being precisely movable in all like directions in response to operation of conveniently located manual controls and having their degrees of movement adjustable with respect to the corresponding movement of said controls to permit the travel ratio therebetween to be changed at will by the operator; whereby the operator is enabled to adjust the apparent motion desired for each micro-tool in the object field of the microscope to correspond to the magnification of the instrument and the natural motion of the operator's hand when manually operating said controls.

A further object is the provision of a micromanipulator of the above character which embodies conveniently arranged coarse and fine adjustment means for accurately and efficiently positioning the micro-tool or micro-tools thereof so as to securely maintain the tip portions of the tools in the object field of the instrument.

Another object is the provision of a micromanipulator of the above character and wherein the micro-tool supports thereof are retained in place by improved spring-loaded thermal expansion wire means in such a way as to be without mechanical friction impeding movement thereof; hence with no "backlash" or erratic movement will occur, and wherein said expansion wire means is of such nature that time lag during expansion and contratcion thereof is reduced to a minimum.

A further object of the invention is to provide an improved micromanipulator for use with a microscope or the like, said micromanipulator comprising from one to four compact, conveniently arranged, light weight manipulator heads for supporting micro-tools which are constructed and arranged to extend simultaneously into the object field of the microscope, a pair of controls for moving two of said micro-tools simultaneously or separately and readily operable means to instantaneously shift from a control of any selected micro-tool to a different micro-tool, as well as central power supply and ratio control unit which controls the ratio of the hand motion to micro-tool motion.

A still further object is the provision of improved means for conveniently, accurately and adjustably supporting a microscope relative to the micromanipulator with which it is to be used, whereby the entire microscope is permitted to slide out of an operative position when micro-tools are to be changed and thus obviating disturbing the specimen.

Other objects and advantages of this invention will become apparent from the following description when taken in connection with the accompanying drawings, in which.

Micromanipulators of superior performance and facility of operation are greatly needed for precise microbiological, microphysical and like investigations. Cancer research specialists, for example, can employ them to great advantage in introducing viruses, protoplasmic particles, and other chemicals into living cells. In fact the uses to which an efficient, accurate and rapidly responsive device of this type can be put are too numerous to be mentioned at this time.

Figure 1:
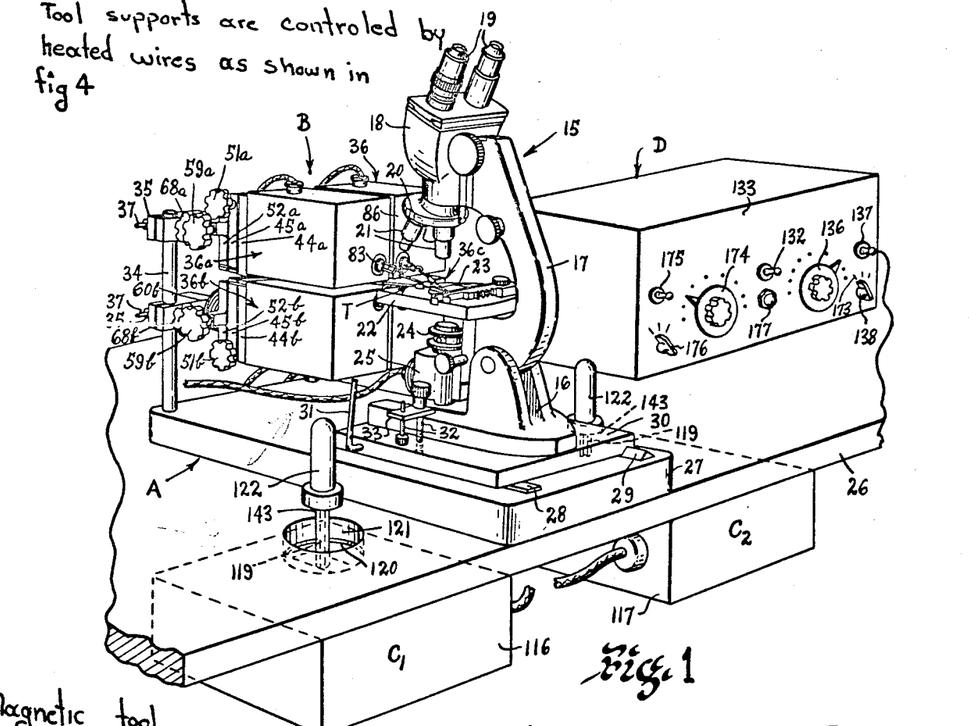
Fig. 1 is a perspective view of a micromanipulator embodying the present invention and shown in position for use with a conventional microscope having readily interchangeable objectives.

Referring to the drawings, and in particular to Fig. 1, there is shown a conventional compound binocular microscope 15 which embodies a stand or base 16 having an upright arm 17 pivotally carried thereby. The arm 17 carries a binocular body tube 18 which contains the usual prisms for directing light rays entering an objective aligned therewith to respective eyepieces 19. To the lower side of the body tube 18 is attached a revolvable nosepiece 20 carrying a plurality of such objectives 21 any one of which is adapted to be selectively aligned with the optical system of the microscope.

Beneath and in closely spaced relation to the aligned objective is a stage 22 on which is adapted to be located a transparent plate or microscope slide 23 carrying a specimen or specimens to be examined. Below the stage 22 and adjustably carried by a lower part of the arm 17 is a substage condenser 24 containing a condensing lens system (not shown) for directing light in usual fashion upwardly from a substage illuminator 25 through an opening in the stage 22 and onto the specimen. From this, it is readily apparent that an observer viewing through the eyepieces 19 will be able to view the specimen on slide 23, with the specimen being magnified a preselected amount in accordance with the particular objective 21 and eyepieces combination being used. The microscope 15 per se does not constitute a part of the present invention, for any conventional microscope could be used in its place, to function with the micromanipulator about to be described and therefore, it is believed a more detailed description of the microscope is unnecessary.

A micromanipulator embodying the present invention and arranged for use with the microscope 15 is shown in Fig. 1 and constitutes several separate but interconnected parts A, B, C₁, C₂ and D adapted to be located on or beneath a suitable shelf or table 26. A microscope and manipulator head supporting structure is indicated at A and comprises a relatively heavy substantially flat base 27 having a pair of spaced longitudinally extending machined rails 28—29 carried on its upper surface on which a movable base plate 30 is slidably mounted. The rails 28 and 29 are of different predetermined shapes, one being flat and the other thereof being V-shaped in cross section and thus adapted to interfit with a groove formed in the under side of the base plate 30. In this manner precise rectilinear sliding movement of the base plate 30 may be accomplished, after which the base plate 30 may be locked in an adjusted position on the rails by suitable means (not shown) which may be operated by a handle or the like 31. Any suitable clamping means may be provided for fastening the microscope base 16 to the movable base plate 30 such as adjustable threaded members 32 and a retainer 33 shown in Fig. 1. Thus, the microscope 15 is connected to and movable fore and aft with the base plate 30 on the normally fixed base 27 longitudinally of rails 28 and 29.

Figures 2, 3, 4, 5, 6:
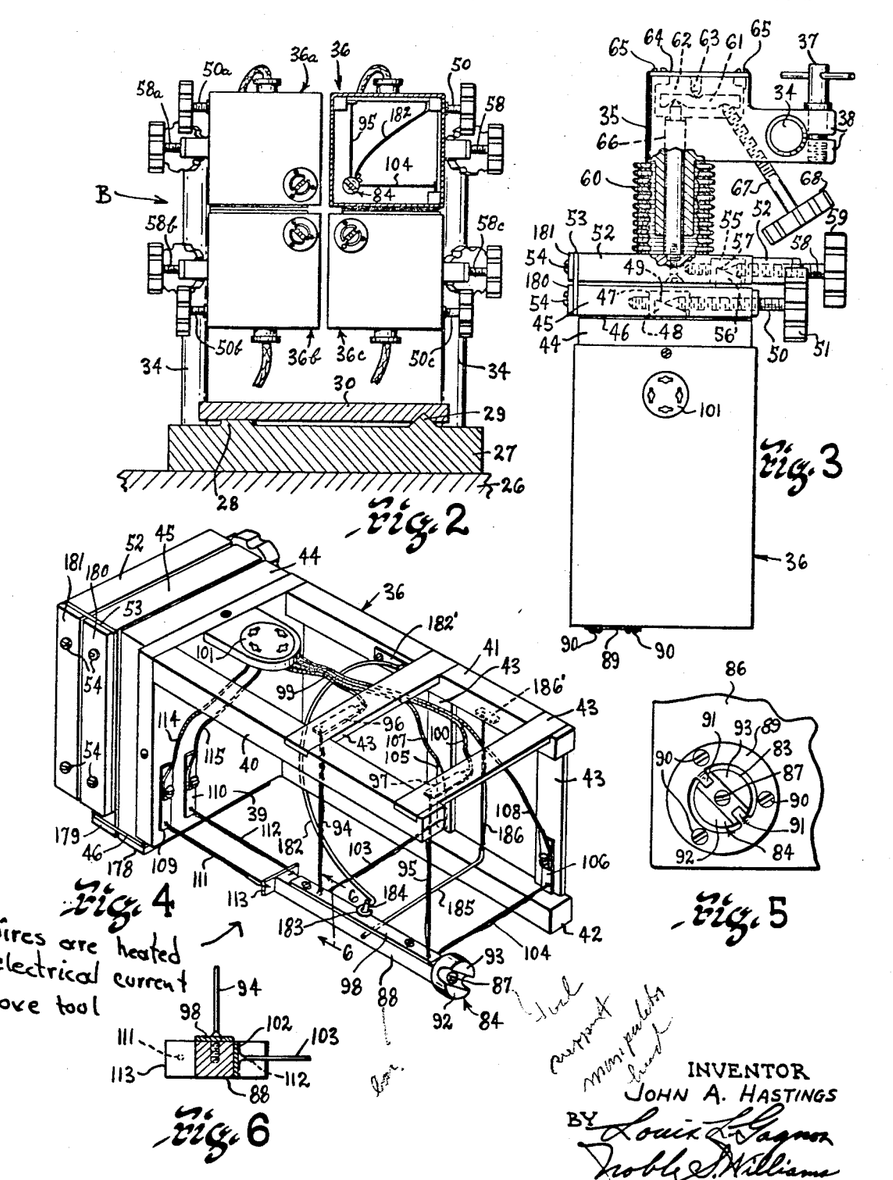
Fig. 2 is a front elevational view, partly in section, of a plurality of micro-tool supporting heads and supporting means therefor.
Fig. 3 is an enlarged top plan view of one of the micro-tool supporting heads shown in Fig. 2.
Fig. 4 is an enlarged perspective view of a major portion of the device shown in Fig. 3, the cover plates therefor having been removed.
Fig. 5 is an enlarged fragmentary front elevational view of a portion of a supporting head having a magnetic chuck therein.
Fig. 6 is an enlarged vertical sectional view taken substantially on line 6—6 of Fig. 4 looking in the direction of the arrows.

Extending upwardly from the rear of the fixed base 27 are a pair of spaced supporting posts 34 which carry adjustment clamps 35 by means of which a manipulator head assembly B comprising in the present instance four micromanipulator heads 36, 36a, 36b and 36c is adapted to be supported in operative relation relative to the stage 22 of the microscope. Each clamp 35, as shown in Fig. 3, is split adjacent a bore therein for receiving the respective posts 34 and a hand screw 37 connects the bifurcated end 38 formed thereby so that by tightening the screw 37 the bifurcated ends 38 will be drawn toward one another and into tight engagement with the posts 34, thereby preventing sliding movement of the clamps 35 on the posts 34. In this manner approximate position of each head, both vertically and laterally, can be easily accomplished.

Each head 36, 36a, 36b or 36c carries, by support means to be described hereinafter, a micro-tool T which is to be positioned and moved within the object field of the microscope 15. Each head 36 is supported by a clamp 35 and each comprises a base plate 39 (see also Fig. 4) formed of dielectric material, such as wood or plastic, and from three of the corners thereof extend three forwardly projecting non-conductive bars or struts 40, 41 and 42 which form an open frame braced by non-conductive crosspieces 43. The base plate 39 has a metallic adjustment plate 44 fixedly secured in face-to-face relation with its outer or rear surface. A vertical coarse adjustment plate 45 is disposed in slightly spaced relation to the outer or rear surface of the adjustment plate 44, the plates 44 and 45 being connected together along adjacent edges by means of a stiff spring or yieldable plate 46 with clamping caps 178 and 179 being attached to said adjacent edges by screws or the like (not shown) which extend through the caps and the spring or plate 46 and serve to retain these parts in assembled relation.

The rear surface of the plate 45 in a central portion thereof is provided with a recess 47 (see Fig. 3) which is adapted to receive a camming member 48 carried by the plate 44. The camming member 48 has an inclined outer surface 49 which is adapted to be engaged by the conical end of an adjustment screw 50 which extends through the plate 45 from one side thereof. Manual rotation of the screw 50 by means of knob 51 thereon will cause forceful engagement of the end of the screw 50 with the inclined surface 49 of the camming member 48 and thus will result in vertical swinging movement of the camming member 48, plate 44 and other portions of the head 36 connected thereto (including the micro-tool T) in a downward direction by flexure of the spring plate 46. Reverse rotation of the screw 50 will allow the inherent resiliency of the heavy spring 46 to swing the head and thus the micro-tool back to their initial positions.

In slightly spaced relation with the rear surface of the vertical adjustment plate 45 is a transverse coarse adjustment plate 52 which is connected to plate 45 by a similar heavy spring plate 53, caps 180 and 181 adjacent side edges thereof and screws 54. The inner or forward surface of the plate 52 is recessed as shown at 55, and extending into the recess 55 is a camming member 56 fixedly carried upon the rear surface of plate 45. The recess 55 and camming member 56 are located near the sides of the plates 52 and 45 respectively opposite the spring connected sides thereof, and the camming surface 57 of the member 56 is inclined so as to be engaged by the conical end of a screw 58 which is threaded into the plate 52 and a projection 52′ thereof from said opposite side thereof. The screw 58 is provided with a knob 59 by which it may be manually rotated inwardly to urge the inner end thereof forcefully against the surface 57 of the camming member 56. In this manner the plate 45 carrying plate 44 and parts of the manipulator head secured thereto, including a micro-tool, will be caused to swing transversely relative to the object field of the microscope with spring plate 53 in effect serving as a vertical axis. Reverse rotation or withdrawal of the screw 58 will, of course, function to permit spring plate 53 to return the head and micro-tool back to their initial positions.

Attached securely directly to the rear surface of the plate 52 is one end of an expandable metallic bellows 60 which has its other end fixedly secured to the clamp 35. Thus the bellows may function both as means for supporting the head 36 and, due to its adjustable length, as means for permitting coarse fore and aft adjustment of the head 36 (and thus a micro-tool T) in a direction toward or away from the microscope 15. Operable means for manually accomplishing this coarse adjustment comprises a lever 61 disposed within a recess 62 in the clamp 35 and adapted to pivot on a fulcrum 63. Fulcrum 63 is carried by a plate 64 attached as by screws 65 or the like to the rear surface of the clamp 35. A compression shaft 66 is mounted for longitudinal movement within a bore in the clamp 35 and has a portion of its length extending through the bellows 60 so as to have one end thereof in engagement with a recess in the lever 61 and the other end in engagement with a recess in the rear surface of the adjustment plate 52.

Engaging the lever 61 at the opposite side of the fulcrum 63 is the conical end of a screw 67 which is threaded into and carried by the clamp 35. By manually rotating a knob 68 on the outer end of the screw 67, in the proper direction will cause screw 67 to press upon one end of the lever 61 and cause the opposed end thereof to swing toward the front of the device. Such movement of the lever 61 will cause the compression shaft 66 to expand the bellows 60 and urge the plates 52, 45, and 44, head 36, and micro-tool toward the microscope 15, this expansion being against the inherent tension of metallic bellows 60. It is obvious that retraction of the screw 67 will permit the bellows 60 to retract and automatically return the parts to their initial positions. From the above, it will be apparent that coarse adjustments of the micro-tool T may be readily made by vertical, transverse and fore and aft adjustments of the head as described.

Although only one of the manipulator heads 36 and coarse adjustment means therefor is shown in detail in the drawings, it is to be understood that the other three heads namely, 36a, 36b and 36c are of similar constructions, and accordingly corresponding parts have been indicated by like numerals but having the suffixes "a," "b" and "c" added thereto. In the complete manipulator head assembly B shown in Fig. 2, however, it is to be noted that the lower heads 36b and 36c are of such an arrangement and are so mounted that inward movement of the vertical adjustment screws 50b and 50c respectively will function to cause vertical adjustment of the heads 36b and 36c in an upward direction. Of course inward movement of screw 50a, like 50, will cause downward movement of the associated head 36a.

Likewise, the heads 36a, 36b and 36c are so arranged that by manually turning the respective screws 58a, 58b and 58c inwardly, the heads will be caused to swing laterally inwardly about vertical axes at the inner sides provided by spring means like spring 53. In this way it is apparent that all of the micro-tools T carried by the respective heads 36, 36a, 36b and 36c can be made to move toward or away from one another by coarse adjustment means and thus the effective points of the tools thereof can all be easily adjusted into adjacent location so as to function in close proximity to one another.

Figures 7, 8, 9:
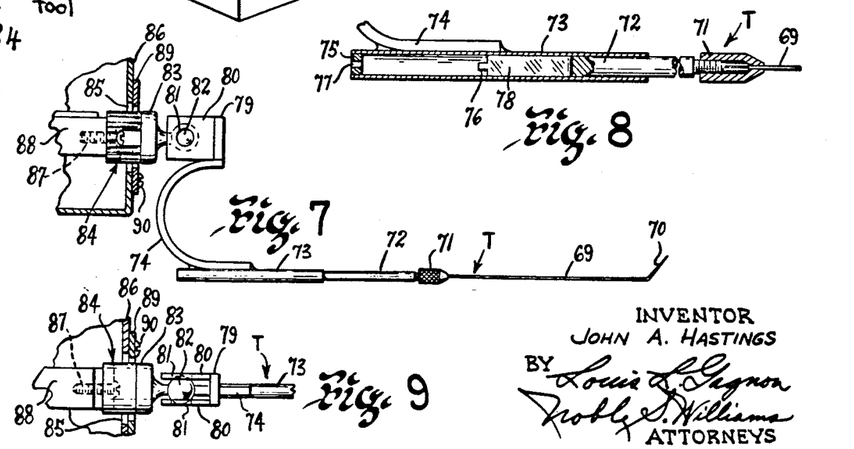
Fig. 7 is an enlarged fragmentary side elevational view, partly in section, of a micro-tool and supporting means therefor.
Fig. 8 is an enlarged vertical sectional view of the micro-tool of Fig. 7.
Fig. 9 is a top plan view, partly in section, of structure shown in Fig. 7.

Referring now particularly to Figs. 7, 8 and 9, it will be seen that each micro-tool T is a relatively long thin needle like element 69 formed of a glass, metal or plastic and having an angle pointed tip portion 70. The needle 69 is supported by a suitable collet chuck 71 carried by one end of a tool shaft 72. The tool shaft 72 is telescopically mounted for sliding movement longitudinally within a supporting sleeve 73 which is fixedly attached to an arcuate lateral displacement arm 74. The outer or rear end of the sleeve 73 is closed by a plug 75 having a transverse slot 77 therein, and the inner end 76 of the shaft 72 is shaped to provide a transverse tongue to interfit with slot 77. Thus shaft 72 may be restrained from rotary movement when tongue 76 is contained within slot 77 and the chuck 71 is being rotated to clamp or release a needle 69 therefrom. The inner end of the shaft 72 is preferably split to provide two separable longitudinal portions 78 which tend to spread apart slightly to provide resilient engagement with the inner walls of the sleeve 73. Such frictional engagement, of course, will tend to retain the shaft 72 in its longitudinally adjusted position within the sleeve 73 during normal use of the device.

The arcuate arm 74 is in turn fixedly attached to a clevis 79, the spaced resilient arm portions 80 of which are provided with aligned openings 81 for pivotally receiving a spherically shaped bearing 82 which is fixedly carried by a button 83 of ferrous material. This ferrous metal button 83 is thus adapted to be removably held upon the exposed end of a magnetic chuck 84 and each of the respective manipulator heads 36, 36a, 36b and 36c will be provided with such a magnetic chuck. The magnetic chuck 84 is positioned freely within an opening 85 in a front wall portion of a removable housing 86 for the manipulator head and is attached as by a screw 87 or the like to one end of an elongated non-conductive floating bar 88 extending substantially parallel to and in spaced relation relative to the non-conductive frame forming bars 40, 41 and 42. An annular escutcheon 89 (see Fig. 5) is attached as by screws 90 or the like to the front wall portion in encircling relation to the magnetic chuck 84. The escutcheon 89 is provided with a pair of inwardly directed diametrically opposed tabs 91 which are normally positioned freely between frontal extensions 92 and 93 of the magnetic chuck representing the north and south poles thereof. These tabs 91 function to limit the extent of rotary movement permitted the chuck 84 and thus protect delicate parts within the housing 86 and presently to be described.

The floating bar 88 is the principal element of the manipulator head functioning to impart microscopic movement to associated micro-tool through the medium of the magnetic chuck 84, button 83, spherical bearing 82, clevis 79, arcuate arm 74, and telescopic members 72 and 73. This floating bar 88 is connected by vertically disposed electrically conductive thermal expansion wires 94 and 95 to the free end portions of thin flexible ribbon-like metal attachment plates 96 and 97 the opposite end portions of which are fixedly attached to the under sides of the two upper non-conductive crosspieces 43 (Fig. 4). The lower ends of these substantially parallel wires 94 and 95 are securely attached to spaced portions of a metallic interconnecting plate 98 which is screwed or otherwise secured to the upper side of the floating bar 88. To the fixed ends of plates 96 and 97 are connected respective conductors 99 and 100 which extend to an electrical receptacle 101. Thus, it will be apparent that application of an electric current to the conductors 99 and 100 through receptacle 101 will form a circuit through both expansion wires 94 and 95 and through metal connecting plate 98. The purpose for these flexible free end portions of the plates 96 and 97 is to absorb any tendency for the 120 heating pulses per second of a conventional 60 cycle A. C. current, for example, to cause an unsteadiness at the tip of the micro-tool in the magnified object field of the instrument. Should the heating of these wires be performed by D. C. current this quivering of the tool tip would be entirely removed.

The expansion wires 94 and 95 are relatively fine and preferably formed of a suitable heat-resistant alloy for ruggedness. Heating of the wires 94 and 95, as various amounts of current are supplied thereto, causes expansion thereof and a resultant downward movement of the floating bar 88, and consequently of the micro-tool T also. The time required for this heating and expanding is relatively short due to the small diameter of the wires 94 and 95. With an arrangement of this type it has been found possible to obtain vertical travel of as much as 400 microns within one second after the current is applied. Interruption or lessening of the electrical circuit will on the other hand cause cooling of the wires and their resultant contraction will move floating bar 88 and micro-tool T upwardly.

For transverse motion of the floating bar 88, a metallic interconnecting plate 102 (see Figs. 4 and 6) mounted on the inner side of the floating bar 88 is connected by means of similar substantially parallel horizontally disposed resistance wires 103 and 104 to respective metal attachment plates 105 and 106 carried by the two vertical crosspieces 43 of the open fame. Conductors 107 and 108 extending from the receptacle 101 are connected to these plates and thus electric current may travel from the receptacle 101 through these conductors, attachment plates, the horizontal wires and the interconnecting plate and this will cause heating and expansion of the wires 103 and 104. This will allow movement of the bar 88 and consequently the micro-tool T transversely in a direction away from the frame bar 42. When current is interrupted or lessened, of course, the resultant cooling and contraction of the wires 103 and 104 will cause consequent movement of the bar 88 and micro-tool T in the opposite direction. Heat baffle means may be used, if desired, between different pairs of heating wires to prevent the heat from one pair influencing another pair.

The floating bar 88 is also movable in a fore and aft direction or in other words, in a direction longitudinally of the head. To accomplish and control this movement the previously mentioned non-conductive base plate 39 carried a pair of spaced attachment plates 109 and 110 to which are fixedly attached the ends of substantially parallel horizontally disposed resistance wires 111 and 112, the other ends of these wires being similarly attached to a metal interconnecting plate 113 screwed or otherwise secured to the rear end of the floating bar 88. The plates 109 and 110 and plate 113, it will be noted, are so arranged that these wires extend in directions substantially parallel to the length of the bar 88. Conductors 114 and 115 connect attachment plates 109 and 110 to the receptacle 101 and thus electric current from the receptacle 101 may in like manner pass through the conductors 114 and 115, through wires 111 and 112 and through interconnecting plate 113 to cause heating and expansion of the wires. The resultant movement of the bar 88 and micro-tool T supported thereby will be in a direction away from the base plate 39. Similarly subsequent interruption or lessening of the current will cause the bar 88 and micro-tool T to move in the reverse direction.

An elongated member 182 is connected at one end by a bracket 182' to the inner side of frame member 41 and extends arcuately as shown in Fig. 4, toward the floating bar 88. The free end of this spring member is looped as shown at 183 and is arranged to freely movably receive a pin 184 carried by interconnecting plate 98. This arrangement flexes the spring member 182 so that it tends to urge the bar 88 outwardly, laterally and downwardly as well as forwardly to keep the three pairs thermal expansion wires just described taut. The spring member 182, also, purposely has a slight tendency to rotate the floating bar 88, and consequently the magnetic chuck 84 thereon in a predetermined direction about its longitudinal axis (in the present disclosure in a clockwise direction), and to prevent such rotary movement and provide a stabilized arrangement a rod 185 has one end thereof anchored to bar 88 and has its other end connected to a flexible restraining wire 186 connected at 186' to frame member 41. Wire 186 and rod 185 thus prevent undesired rotational movement of the bar 88.

Micro-tool motion can thus be obtained by each of the manipulator heads 36, 36a, 36b and 36c in any direction to an extent of as much as 400 microns. It is quite possible, with the controls and circuits for the electrical system to be hereinafter described, to accurately move and control the bar 88 and thus micro-tool T in any one direction any fractional part of this distance or even to move the tool T in like manner any amount simultaneously in any two or all three directions as desired. A 400 micron movement will be more than adequate for use with low microscope magnifications. At medium and higher magnifications the travel will be less. At high magnifications, it has been found, the tool may even be readily accurately controlled and moved to a desired position within as little as a fraction of a micron.

The actual extent of movement of a tool in any direction may be controlled by the amount of rise or fall in temperature of the three pairs of wires 94—95, 103—104 and 111—112; and means is provided for varying the voltages in the circuits including each pair of wires so that the current passing therethrough will be consequently varied, with resultant variations in the temperatures of the wires themselves.

To supply current for such functioning of the temperature responsive pairs of wires there is provided a pair of similar control devices $C_1$ and $C_2$ comprising box-like structures 116 and 117 which are preferably located at opposite sides of the microscope 15 and attached to the under side of the shelf or table 26 as shown in Fig. 1. Each control device in fact comprises a "joy stick" or control lever 119 (see Figs. 10, 11 and 12) which extends upwardly through an enlarged opening 120 in the top of the housing and a similar opening in shelf 26 and this lever has a knob control 122 secured to its upper end. The lower end of the lever 119 lies within the housing and is attached by a universal connection 123 to the upper end of a short shaft 124 which has its smaller lower end 126 in turn journaled in an inverted U-shaped bracket 125 bolted or otherwise attached to a removable bottom 118 of the housing 116 or 117. The end portion of this shaft below the bracket 125 carries a pulley 127 keyed or otherwise secured thereon. To control vertical movement of a micro-tool T, manual rotation of the lever 119 about its own longitudinal axis causes responsive rotary movement of the pulley 127 regardless of the angle at which the lever 119 may be at any time disposed relative to the vertically extending shaft 124, since universal connection 123 is of such construction as to provide such movement.

The pulley 127 is connected by a flexible belt or cable 128 to a pulley 129 carried by a conventional variable step-down autotransformer 130. While pulley 129 is here shown as being smaller than pulley 127, it might be at times, for more exact control, desirable to have pulley 129 as the larger. In fact, any one of a wide range of pulley ratios may be used here. The variable transformer 130 is secured by screws 131, or other suitable means, to the bottom 118 of the housing and is electrically connected to the power supply unit D for the micromanipulator heads in the manner shown by the wiring diagram (Fig. 13) and to be hereinafter more fully described.

The lever 119 can also be swung forwardly and rearwardly (toward and away from the operator) for moving the microtool T in similar directions. The lever 119 which is cylindrically shaped is provided for this purpose with an enclosing sleeve 143 which is in turn rotatably received within a central opening in an inverted U-shape connecting yoke 144. Downwardly extending diametrically spaced arm portions 145 of yoke 144 are pivotally supported by pivot pins 146 threaded through diametrically spaced lugs 147 extending upwardly from the opposite sides of a lower yoke 148. The opposite ends of this lower yoke 148 are also provided with diametrically spaced upwardly extending lugs 149 (see Figs. 10 and 12) and these lugs 149 are in turn pivotally connected by a pair of aligned pivot studs 150 to supporting walls 151a and 151b provided therefor within the housing 116 or 117.

The aligned pivot pins 146 and the aligned pivot studs 150 lie in a common plane intersecting the center of the universal connection 123. Thus, when the lever 119 is moved forwardly or rearwardly, resultant swinging movement of the connection yoke 144, and lower yoke 148 moving therewith, will take place about the axis of the pivot studs 150. Simultaneously pivoting between lever 119 and shaft 124 will take place at universal connection 123. Attached to the upwardly extending lugs 149 of the lower yoke 148 adjacent the supporting wall 151b and rotatable with this lug about the aligned pivot stud 150 is a pulley 152 which is connected as by a cable 153 to a smaller pulley 154 carried by a variable autotransformer 155 similar to transformer 130. This transformer 155 is bolted or otherwise secured to the wall 151b and thus fore and aft movement of the lever 119 and consequent rotation of pulleys 152 and 154 will cause resultant rotary movement of a brush carrying arm 156 of the transformer 155.

Figure 10:
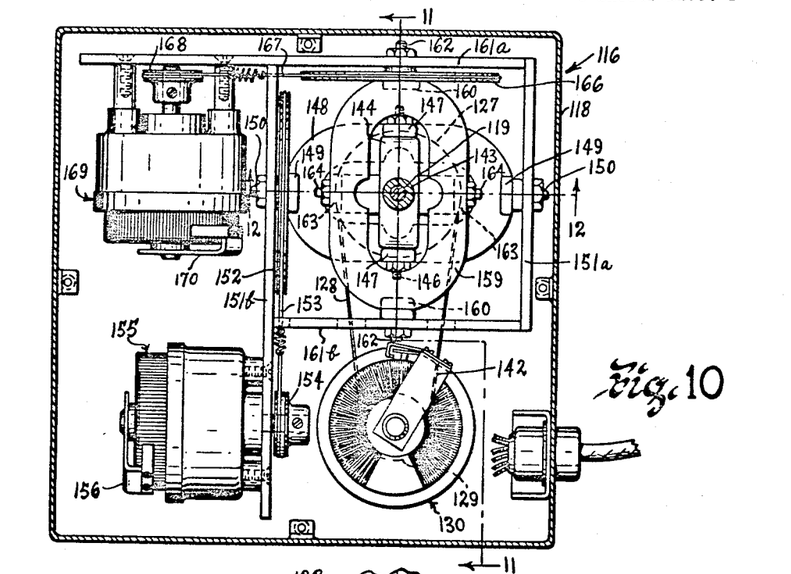
Fig. 10 is a top plan view of one of the control units with an upper portion of the cover plate therefor removed.
Figures 11, 12:
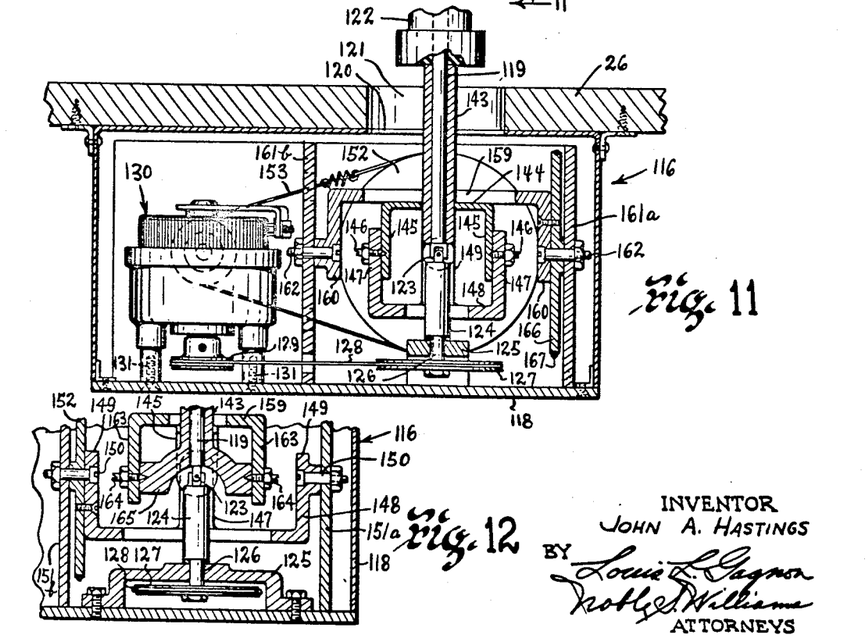
Fig. 11 is a vertical sectional view taken substantially on line 11—11 of Fig. 10 and looking in the direction of the arrows.
Fig. 12 is a fragmentary vertical sectional view taken substantially on line 12—12 of Fig. 10 and looking in the direction of the arrows.

Still referring to Figs. 10, 11 and 12, it will be seen that the lever 119 can also be swung transversely to either side for moving the micro-tool T in a similar direction. To accomplish this action the sleeve 143 which encircles the lever 119 is provided at its lower end with an integral arched cross head 165 (see Fig. 12). The opposite ends of this cross head receive the inner ends of a pair of aligned pivot pins 164 which are threaded through the downwardly extending ends of diametrically opposed side lugs 163 of an upper yoke 159. Yoke 159 is also provided at each end with a downwardly extending lug 160 by which it is connected to supporting walls 161a and 161b in the housing 118, the lugs 160 being attached to these walls by aligned pivot studs 162. These studs are likewise axially aligned with the center of the universal connection 123 so that the yoke 159 may be rotated about the axis of the pivot studs 162.

In other words, when the control handle 122 is in its upright or vertical position, the axes of pins 146, of studs 150, of pins 164 and of studs 162 all lie in a common horizontal plane containing the center of the universal connection 123. With this construction and arrangement, it is apparent that the lever 119 can be moved or swung transversely to tilt the upper yoke 159 without affecting the position of the lower yoke 148. Also it may be tilted forwardly and rearwardly to cause movement of the lower yoke 148 without affecting the position of the upper yoke 159. Thus, all three motions of the control 122 for fore and aft transverse and vertical movement of the micro-tool T may be performed independently of one another. Also it will be appreciated they, any two or all three, may be performed simultaneously if desired.

Attached to the rear downwardly extending lugs 160 of the upper yoke 159 and rotatable therewith about the axis of studs 162 is a pulley 166 which is connected by a cable 167 to a smaller pulley 168 carried by a variable autotransformer 169, which is similar to transformers 130 and 155. Transformer 169 is fastened by bolts or the like to the wall 161a. Thus, transverse swinging movement of the lever 119 will rotate pulley 166 and pulley 168 and this will cause resultant rotary movement of the brush arm 170 of the transformer 169.

Figure 13:
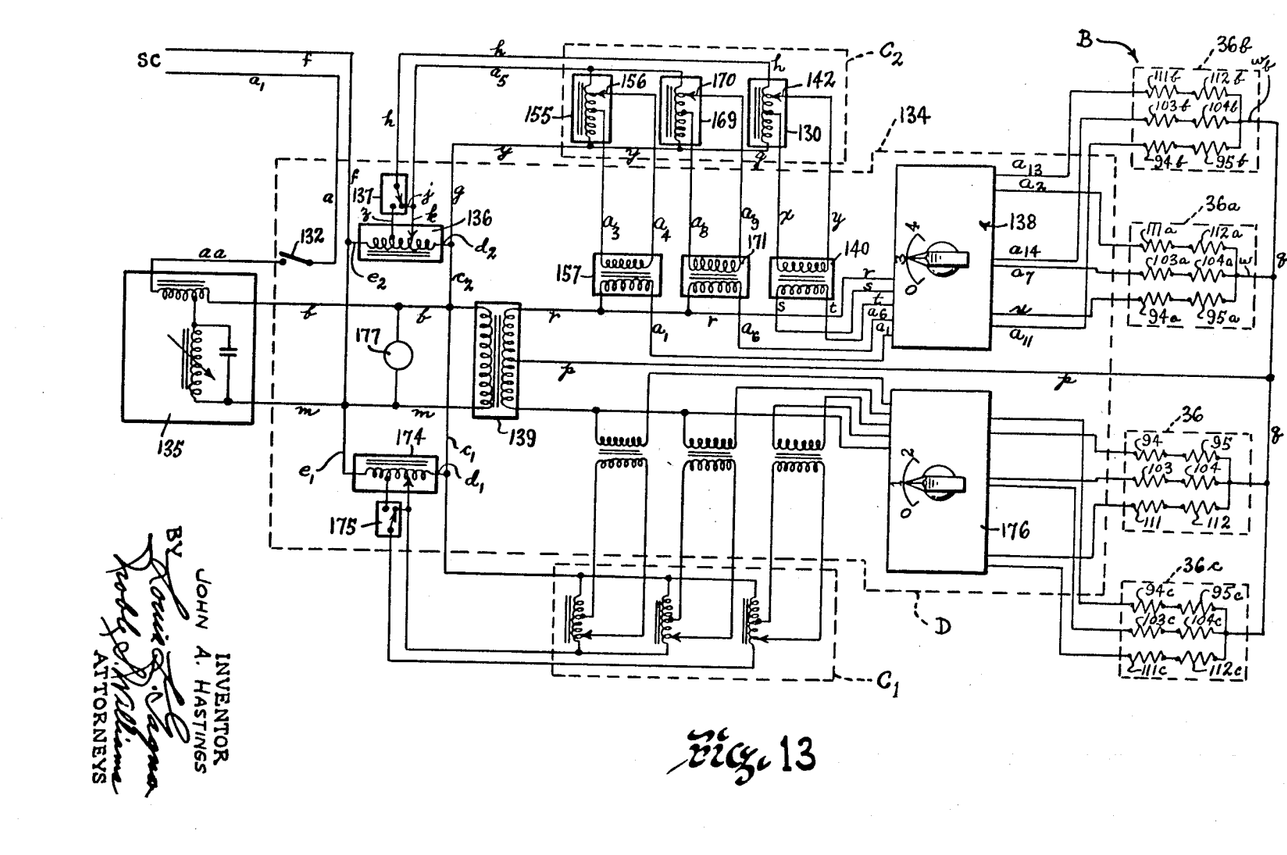
Fig. 13 is a wiring diagram of the electric controls of a micromanipulator embodying the present invention.

A main electric power supply and selector unit D is shown in Fig. 1 and also diagrammatically indicated by dotted line rectangle in Fig. 13. In Fig. 13 is also diagrammatically indicated the left and right hand control units $C_1$ and $C_2$ and the letter B indicates generally the four separate manipulator head units 36, 36a, 36b and 36c. It will be seen in Fig. 13 that current may flow from an alternating current source SC through a conductor $a_1$ to a main on-off switch 132 mounted on a central control panel 133 (see Fig. 1). From the main switch 132 the current passes through conductor $aa$ to a constant-voltage transformer 135 of known construction and then divides and so that half of the current passes through conductor $b$—$c_2$—$d_2$, a variable transformer 136 and conductor $e_2$—$f$ to the source SC, while the other half passes through conductor $b$—$c_1$—$d_1$, variable transformer 174 and conductor $e_1$—$f$ back to the source SC. The secondary of constant voltage transformer 135 is used to energize the primary of a biasing transformer 139 through conductors $b$ and $m$. Energizing of the variable transformer 130, previously mentioned for vertical displacement of a micro-tool T, is accomplished by the secondary side of transformer 136 supplying current through a circuit comprising conductors $d_2$—$g$—$h$—$j$, switch 137 and the adjustable brush $k$ of the transformer 136. The variable secondary of transformer 130 is connected by conductors $x$ and $y$ and control brush 142 to a booster transformer 140.

Figure 14:
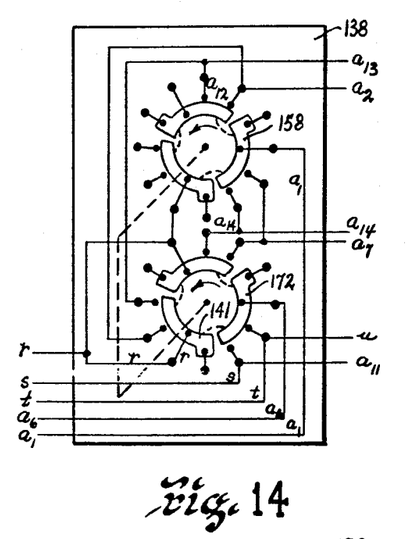
Figs. 14, 15 and 16 are schematic diagrams of a selector switch shown in three positions of use.

Assuming that the micro-tool T carried by micromanipulator head 36a is to be adjusted vertically, upwardly or downwardly, it is necessary to increase or decrease the temperature of the resistance wires 94a and 95a. A selector switch 138 (carried by panel 133 in Fig. 1) is first turned from its 0 or "off" position to its #3 position indicating that head 36a is to function. Switch 138 is provided with a plurality of separate simultaneously movable blades which are shown in more details in Figs. 14, 15 and 16. Switch 138 in its "off position is shown in Fig. 14 and in its #3 position in Fig. 15.

Figure 15:
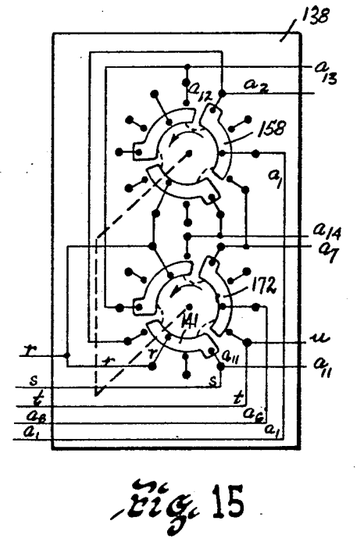

It will be seen from Figs. 13 and 15 that wires 94a and 95a of the head 36a are continuously energized during operation of the device from the secondary of the biasing transformer 139, which is preferably center tapped to provide bias voltages of substantially equal amounts to each pair of right and left hand manipulator heads being used. The complete circuit for energizing wires 94a and 95a thus includes conductor $r$, blade 141 of switch 138 (Fig. 15), conductor $s$, the secondary of booster transformer 140, conductors $t$ and $u$ to wires 94a and 95a and then conductors $w$—$q$—$p$ connecting with the center tap of transformer 139. The primary of the booster transformer 140 is connected, as previously stated, through conductor $x$ to an intermediate tap on the secondary side of variable transformer 130 and by conductor $y$ to the adjustable brush 142 on the transformer.

Thus, manual adjustment 142 of variable transformer 130 may be used to vary the amount of current passing through wires 94a—95a and thus control the resultant heating or cooling thereof. It will be seen here that if the control knob 122 of lever 119 is in a position to locate slidable brush 142 of the variable transformer 130 approximately midway along the secondary of the transformer 130 (as it is in fact shown in Fig. 10) it will be adjacent the center tap of the transformer 130 and no current will flow through conductors $x$ and $y$ and the primary of booster transformer 140. Thus the secondary thereof will contribute no current to the circuit supplying heating wires 94a and 95a. Nevertheless a steady current from biasing transformer 139 will be flowing and heating wires will be maintained at a predetermined datum temperature level. If slidable brush 142 is moved to various positions to one side of the center tap current at correspondingly increased voltages will be supplied to the primary of the booster transformer 140 and the booster transformer will supply current to the biasing circuit already supplying a predetermined current to the heating wires. The current being provided by transformer 140 at this time will be in phase with the biasing transformer current and so will be additive thereto. This increase in current will increase the temperature of wires 94a and 95a and this condition will, therefore, cause a corresponding expansion of the wires 94a and 95a, with consequent downward movement of the micro-tool T associated therewith.

On the other hand, if slidable brush 142 is rotated in the opposite direction from its center position various amounts, current in correspondingly varying amounts will be supplied by transformer 130 to transformer 140 and thus transformer 140 will supply current in varying amounts to the biasing circuit heating the wires 94a and 95a. However, the phase of this current will be reversed and thus it will oppose the biasing transformer current heating the wires. It follows therefore that correspondingly less amounts of current than the normal amount will flow through the wires and thus different amounts of heat, less than the datum level will result and the microtool will move upwardly. In this manner the micro-tool may be moved vertically in either direction from its normal position by rotation of control knob 122.

It is pointed out here that the adjustable arm $k$ of the variable transformer 136 permits current at various voltages to flow from transformer 136 to vertical control transformer 130, whereby the ratio of tool travel to the extent of rotary movement of the lever 119 may be varied and this will be done in accordance with the different powers of magnification being used in the microscope. Thus, it is possible, during ordinary use of the device, through the control of transformer 136 to adjust the ratio of vertical tool travel (and the horizontal and fore and aft tool travels as well, as will appear hereinafter) to be in keeping with the degree of magnification of the microscope. Thus it will appear to the operator that the travel of the micro-tool T in any direction under the microscope corresponds to an equivalent movement of the lever 119. Therefore regardless of the magnification of the optics being used in the microscope, the tool travel may be readily adjusted so as to always be within the object field of the microscope.

At times during use of the microscope, it may be the wish of the operator thereof to move the micro-tool T vertically a relatively large amount and away from certain objects in the field of the microscope before shifting the tool laterally. In this case, switch 137 may be operated to connect conductor $h$ directly with a fixed tap $z$ on the variable transformer 136. When switch 137 is so positioned current at a higher voltage is supplied by transformer 136 in which case maximum vertical travel of the micro-tool T is produced.

With the selector switch 138 still positioned for operation of micromanipulator head 36a, it will be apparent from the wiring diagram of Fig. 13 that the thermal expansion wires 103a and 104a may be heated or cooled in much the same manner to cause transverse movement of the micro-tool T. The wires 103a and 104a are energized by biasing transformer 139 through a circuit including conductor $r$, booster transformer 171, conductor $a_6$, the blade 172 of switch 138 (see Fig. 15), and conductor $a_7$ connected to one end of the wires 103a and 104a, the other end thereof being connected through conductors $w$—$q$—$p$ to the other side of transformer 139. The variable transformer 169 energizes a booster transformer 171 through a conductor $a_8$ which connects one end of the primary of transformer 171 with a center tap on the secondary of transformer 169 and by a conductor $a_9$ which connects the other end of the primary of the transformer 171 with a slidable brush 170 of transformer 169. The transformer 169 itself is energized by the secondary of transformer 136 through a circuit including conductors $d_2$—$g$—$y$ and conductors $a_5$—$k$.

It will be apparent, therefore, that transverse swinging movement of the control lever 119 will cause consequent adjustment of the slidable brush 170 of transformer 169 to either side of the center tap thereon and this movement will produce increases or decreases in the in-phase or out-of-phase current being supplied by booster transformer 171 to the constant current passing through wires 103a and 104a. A change in adjustment of the slidable arm of transformer 136 will effect a change in the extent of overall transverse movement. Thus this overall travel of the micro-tool T can be made to correspond with the size of object field being employed.

With the selector switch 138 still positioned for operation of micromanipulator head 36a, it will be apparent from the wiring diagram of Fig. 13 that control of the heating of wires 111a and 112a may be used to cause fore and aft movement of the micro-tool T. The wires 111a and 112a are constantly energized by transformer 139 through a circuit including conductor $r$, booster transformer 157, conductor $a_1$, blade 158 of switch 138 (see Fig. 15) and conductor $a_2$ to one end of heating wires 111a and 112a. The opposite end of these wires is connected through conductors $w$—$q$—$p$ to the other side of the transformer 139. The variable transformer 155 (operating in a manner like transformer 169) energizes booster transformer 157 through conductors $a_3$ and $a_4$, the former being connected to a center tap on the secondary of transformer 155 and conductor $a_4$ being connected to a slidable brush 156 of transformer 155. Transformer 155 is energized by the secondary of transformer 136 through conductors $a_5$ and $g$. Thus fore and aft movement of the control lever 119 connected to brush 156 of transformer 155 will control and increase or decrease the amount of in-phase or out-of-phase current being supplied by booster transformer 157 to the circuit heating wires 111a and 112a. This change in current will cause heating or cooling and resultant desired expansion or contraction of the wires which will result in fore and aft movement of the micro-tool T. The overall fore and aft travel ratio of the tool T is likewise controlled by slidable brush $k$.

Figure 16:
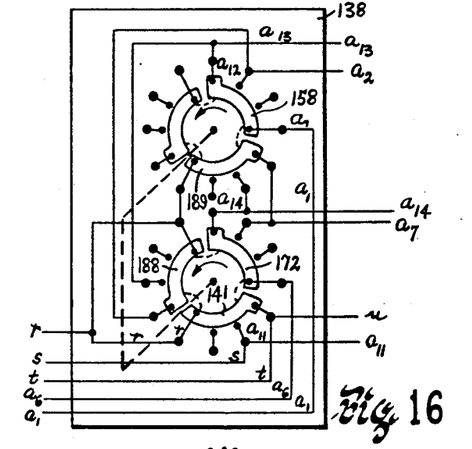

From the foregoing, it will be apparent that with the selector switch 138 located in its #3 position as shown in Fig. 13 (and in detail in Fig. 15) will control the micro-tool T carried by head 36a. However, in order to move the other micro-tool located on the same (left) side of the head assembly B in Fig. 1 and carried by head 36b, it is merely necessary to move the selector switch to its #4 position. The parts of the switch 138 will then be arranged as shown in Fig. 16. The control lever 119 controlling the three variable autotransformers 130, 169 and 155 will now be used through booster transformers 140, 171 and 157 to control movement of the micro-tool T carried by head 36b.

The circuit to energize resistance wires 94b and 95b to cause vertical movement of the tool may now be traced from biasing transformer 139 through conductor $r$, switch blade 141, conductor $t$, booster transformer 140, conductors $s$ and $a_{11}$ to one end of these heating wires. The other end is connected through conductors $w_b$—$q$—$p$ to transformer 139. The circuit to energize wires 111b and 112b from biasing transformer 139 to cause fore and aft movement of the tool passes through conductor $r$, transformer 157, conductor $a_1$, switch blade 158, conductors $a_{12}$ and $a_{13}$ to one end of these wires. The other end thereof is connected by conductors $w_b$—$q$—$p$ to transformer 139. The circuit to energize wires 103b and 104b to cause transverse movement of the tool passes from biasing transformer 139 through conductor $r$, transformer 171, conductor $a_6$, switch blade 172 and conductor $a_{14}$ to one end of these heating wires. The other end of the wires is connected through conductors $w_b$—$q$—$p$ to transformer 139. Thus control lever 119 may be manually manipulated for control of head 36b in the same manner as formerly when operating head 36a.

When selector switch 138 is in its No. 4 position biasing current will flow in not only the heating wires of head 36b but also in all of the heating wires of head 36a as well. (The converse is true when switch 138 is in its No. 3 position.) This is done so that both tools of both heads on the same side of the instrument will be at all times maintained in a "stand-by" or datum location ready for immediate operation when the instrument is turned on even though only one head is under control of the associated joy stick 119 at such times. This stand-by position, of course, is different from the "cold" position of the movable support 83 and the micro-tool T, for when the instrument is in use, the normal biasing temperature for each pair of wires will be in the neighborhood of 950° F. while the normal room temperature will be in the neighborhood of 72° F. The stand-by location for each tool is thus the same as its normal location of zero deviation when under joy stick control; that is when control 119 is upright and control knob 122 is in its neutral or mean position of rotation. Thus regardless of the deviation ratio setting for a transformer 136 the associated tool T will be in its zero or datum location ready for use whenever the selector switch 138 is moved to control same.

Referring to Figs. 13 and 16, it will be seen the current for stand-by heating of the pairs of wires for head 36a, while head 36b is under joy stick control, can be traced as follows: current from biasing transformer 139 will flow through conductor r, switch blade 189 and conductor $a_7$ to wires 103a and 104a, current in conductor r will also flow through switch blade 141 and conductor u to wires 94a and 95a and current in conductor r will flow through switch blade 188 and conductor $a_2$ to wires 111a and 112a. Thus all wires of head 36a will receive biasing current while head 36b is being controlled by the operator.

The switch 138 may also be turned to its "0" or "off" position shown in Fig. 13, and as indicated by the adjustment of the parts in Fig. 14, no current will flow during such adjustment of switch 138 to either head 36a or 36b. At this time both heads will be inoperative regardless of movements of the control lever 119.

Micromanipulator heads 36 and 36c are arranged to be controlled in a similar manner by the control lever 119 of the left hand control box $C_1$. Travel control transformer 174 and cooperating switch 175 serve to control the travel ratio and the vertical retraction of the tools on heads 36 and 36c in a manner similar to the functioning of parts 136 and 137 described above. A switch 176 similar to switch 138 allows either right hand head 36 or right hand head 36c to be used. Thus one or the other right hand head may be used simultaneously with one or the other left hand head. Of course, switches 138 and 176 allow instantaneous shift of the control from one associated head to the other.

A feature of the invention which is a decided convenience for an operator is that the device is arranged so that each tool actually moves in a sidewise direction opposite to the direction of movement of the associated control handle 122 and therefore when the tool is viewed under a compound microscope which normally reverses its image, the tool will appear to be moved in the same direction as the hand of the operator; the control unit for each pair of right and left hand heads being located, for this purpose, on the opposite side of the microscope from that occupied by the heads being controlled thereby.

Inspection of Fig. 2 will readily show that when the four manipulator heads are used in the arrangement shown therein the vertical displacement wires for the upper heads 36 and 36a, on the one hand, will extend upwardly from their respective movable tool supporting members and, on the other hand, the vertical displacement wires for the lower head 36b and 36c will extend oppositely or downwardly from their respective movable tool supporting members. The arrangements of selector switch 138 and selector switch 176 therefore are such that when same are moved to control a lower manipulator head, instead of an upper head, the current being supplied to the vertical displacement wires will be reversely arranged.

Thus, if rotation of a control knob 122 in a certain direction serves to increase the current when connected to an upper head, this same rotation will serve to decrease the current when connected to a lower head. In this way, even though the vertical displacement wires in each pair of upper and lower heads are oppositely arranged with respect to their movable tool supporting members, rotation of the associated control 122 in a selected direction will always bring about upward movement of the tool being controlled and rotation in the opposite direction will produce downward movement.

A pilot light 177 is connected across conductors b and m and indicates when the device is "on" or "off." As stated previously, a convenient stand-by or datum temperature for all the heating wires of all the heads at this time will be in the neighborhood of 950° F.; and of course, at this time any head may be "selected" for control. When under control, the heating wires of a head may be, through the arrangement disclosed herein, increased or decreased various amounts; and even as much as 600 or 700° above and below the above mentioned mean temperature has been used successfully.

Figure 17:
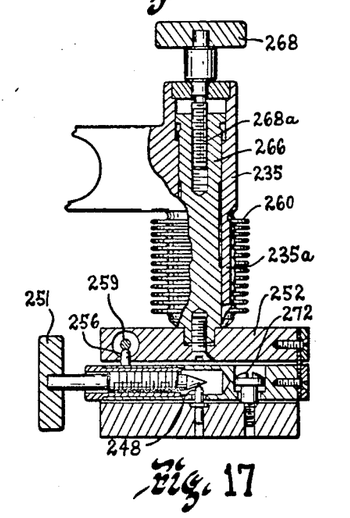
Fig. 17 is a fragmentary top view of a modified form of course adjustment means for a manipulator head, portions thereof being shown in section; and, Fig. 18 is a side view of a part of the structure of Fig. 17.
Figure 18:
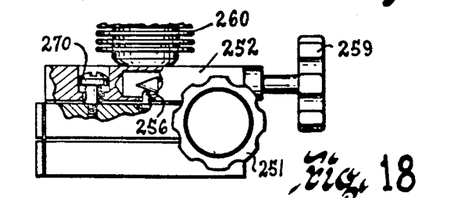

A modified construction for enabling coarse adjustment of a micromanipulator head is shown in Figs. 17 and 18. This construction differs from the first described construction in providing a control 268 for fore and aft movement which is located at the rear of the head rather than at a side thereof. This control has a screw threaded inner portion 268a in engagement with a movable elongated guide member 266 which slides within a well finished bore within the bracket 235 and this guide member is securely bolted or otherwise fixedly secured to the rear plate 252 of the manipulator head. A bellows 260 is arranged to surround a part of this guide member 266 and an extension 235a of the bracket 235 and places these screw threaded parts 266 and 268a under tension so that no lost motion therebetween will occur. The bellows 260 has one end thereof securely attached to the supporting bracket 235 while its opposite end is clamped or otherwise secured adjacent the plate 252. This bellows serves an additional function of preventing any rotation of the manipulator head about the longitudinal axis of the guide member 266. The controls 259 and 251, respectively, for coarse sidewise adjustment and coarse vertical adjustment in this construction are much like those provided in the structure of Fig. 3 except that point contact of the conical ends of the adjustment screws may be desired and is obtained by use of actuating pins 256 and 248 having spherically shaped ends. Also shown in this modification are limiting bolts 270 and 272 each extending through one of the adjustment plates and screw threaded into another and each having an enlarged restraining head portion so that excessive flexing of the spring member interconnecting the adjacent plates may not be excessively flexed and injured. It will be appreciated that in the showing in Fig. 17, as well as in the construction in Fig. 3, a materially elongated supporting area is provided by the bracket 235 (or bracket 35) so that the slidable member therein will have good bearing support for the weight of the manipulator head being carried thereby.

It is apparent from the foregoing description that an improved highly efficient and rapidly responsive micromanipulator has been provided in accordance with the objects of this invention. It will also be apparent, however, that changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

Having described my invention, I claim:

1. A micromanipulator for use with a microscope or like optical instrument having an object field, said micromanipulator comprising a micromanipulator head arranged to be supported in a normally stationary spaced relation relative to said object field during use thereof and having a movable support for supporting a microtool and for accurately moving said tool variable amounts in a plurality of different predetermined directions within said object field, thermal expansion means connecting said movable support to the head, said thermal expansion means comprising a plurality of pairs of electrically conductive wires arranged as separately operable units, each pair of expansion wires extending in a different predetermined direction from said movable support and being adapted when subjected to increases and decreases in temperature to expand and contract and thereby move said micro-tool respectively forwardly and rearwardly in said predetermined directions, electrical means connected with each pair of wires so as to complete an electrical circuit therethrough for heating same and causing movement of said movable support and micro-tool, and readily operable control means operatively connected with said electrical means and arranged to separately variably control the amounts of electrical current being supplied to said pairs of wires, whereby the amount of movement of said micro-tool forwardly and rearwardly in each of said predetermined directions may be accurately controlled.

2. A micromanipulator for use with a microscope or like optical instrument having an object field, said micromanipulator comprising a micromanipulator head arranged to be supported in a normally stationary spaced relation relative to said object field during use thereof and having a movable support for supporting a micro-tool and for accurately moving said tool variable amounts in a plurality of different predetermined directions within said object field, thermal expansion means connecting said movable support to the head, said thermal expansion means comprising a plurality of pairs of electrically conductive wires arranged as separately operable units, each pair of expansion wires extending in a different predetermined direction from said movable support and being adapted when subjected to increases and decreases in temperature to expand and contract and thereby move said micro-tool respectively forwardly and rearwardly in said predetermined directions, resilient means extending between said movable support and said head and functioning to constantly maintain said pairs of wires in a taut condition, electrical means connected with each pair of wires so as to complete an electrical circuit therethrough for heating same and causing movement of said movable support and micro-tool, and readily operable control means operatively connected with said electrical means and arranged to separately variably control the amounts of electrical current being supplied to said pairs of wires, whereby the amount of movement of said micro-tool forwardly and rearwardly in each of said perdetermined directions may be accurately controlled.

3. A micromanipulator for use with a microscope or like optical instrument having an object field, said micromanipulator comprising a micromanipulator head arranged to be supported in a normally stationary spaced relation relative to said object field during use thereof and having a movable support for supporting a micro-tool and for accurately moving same variable amounts in a predetermined direction within said object field, a pair of electrically conductive thermal expansion wires connected to said movable support and to said normally stationary head and arranged when subjected to increases and decreases in the temperature thereof to expand and contract and thereby move said movable support and micro-tool respectively forwardly and rearwardly in said predetermined direction, electrical means connected with said thermal expansion wires so as to complete an electrical circuit therethrough for heating said thermal expansion wires and causing movement of said movable support and said micro-tool, readily operable control means operatively connected with said electrical means and arranged to variably control the amount of electrical current being supplied to said thermal expansion wires and travel of said tool within its travel range, and travel ratio adjustment means connected to said electrical means for varying the current therein to control the size of said travel range, whereby said travel range may be readily selected to agree with the magnifying power of said instrument, and the increments of fore and aft movement of said tool within the selected range and in said predetermined direction may be readily and accurately controlled.

4. A micromanipulator for use with a microscope or like optical instrument having an object field, said micromanipulator comprising a micromanipulator head arranged to be supported in a normally stationary spaced relation relative to said object field during use thereof and having a movable support for supporting a micro-tool and for accurately moving said tool variable amounts in a plurality of different predetermined directions within said object field, thermal expansion means connecting said movable support to the head, said thermal expansion means comprising a plurality of pairs of electrically conductive wires arranged as separately operable units, each pair of expansion wires extending in a different predetermined direction from said movable support and being adapted when subjected to increases and decreases in temperature to expand and contract and thereby move said micro-tool respectively forwardly and rearwardly in said predetermined directions, electrical means connected with each pair of wires so as to complete an electrical circuit therethrough for heating same and causing movement of said movable support and micro-tool, readily operable control means operatively connected with said electrical means and arranged to separately variably control the amounts of electrical current being supplied to said pairs of wires and the travel of said tool within its travel range in each direction, and travel ratio adjustment means connected to said electrical means for varying the current therein to control the size of each travel range, whereby said travel range may be readily selected to agree with the magnifying power of said instrument, and the increments of fore and aft movement of said tool within the selected range and in said predetermined directions may be readily and acurately controlled.

5. A micromanipulator for use with a microscope or like optical instrument having an object field, said micromanipulator comprising a micromanipulator head arranged to be supported in a normally stationary spaced relation relative to said object field during use thereof having a movable support for supporting a micro-tool and for accurately moving same variable amounts in a predetermined direction within said object field, a pair of electrically conductive thermal expansion wires connected to said movable support and to said normally stationary head and arranged when subjected to increases and decreases in the temperature thereof to expand and contract and thereby move said movable support and micro-tool respectively forwardly and rearwardly in said predetermined direction, electrical means connected with said thermal expansion wires so as to complete an electrical circuit therethrough, said electrical means including biasing means tending to constantly cause an electric current to flow through said expansion wires so as to normally constantly heat said thermal expansion wires and maintain said tool at a fixed datum position, booster means for increasing and decreasing said flow and causing movement of said movable support and said micro-tool, and readily operable control means operatively connected with said booster means and arranged to variably control the amount of electrical current being supplied to said thermal expansion wires, whereby the amount of movement of said micro-tool forwardly and rearwardly in said predetermined direction from said datum position may be accurately controlled.

6. A micromanipulator for use with a microscope or like optical instrument having an object field, said micromanipulator comprising a micromanipulator head arranged to be supported in a normally stationary spaced relation relative to said object field during use thereof and having a movable support for supporting a micro-tool and for accurately moving said tool variable amounts in a plurality of different predetermined directions within said object field, thermal expansion means connecting said movable support to the head, said thermal expansion means comprising a plurality of pairs of electrically conductive wires arranged as separately operable units, each pair of expansion wires extending in a different predetermined direction from said movable support and being adapted when subjected to increases and decreases in temperature to expand and contract and thereby move said micro-tool respectively forwardly and rearwardly in said predetermined directions, electrical means connected with each pair of wires so as to complete an electrical circuit therethrough, said electrical means including biasing means tending to constantly cause an electric current to flow through each pair of expansion wires so as to normally constantly heat said expansion wires and maintain said tool at a fixed datum position, and readily operable booster means for increasing and decreasing the flow of current in each pair of said expansion wires and causing movement of said movable support and micro-tool in each of said plurality of directions.

7. A micromanipulator for use with a microscope or like optical instrument having an object field, said micromanipulator comprising a micromanipulator head arranged to be supported in a normally stationary spaced relation relative to said object field during use thereof and having a movable support for supporting a micro-tool and for accurately moving same variable amounts in a predetermined direction within said object field, a pair of electrically conductive thermal expansion wires connected to said movable support and to said normally stationary head and arranged when subjected to increases and decreases in the temperature thereof to expand and contract and thereby move said movable support and micro-tool respectively forwardly and rearwardly in said predetermined direction, electrical means connected with said thermal expansion wires so as to complete an electrical circuit therethrough, said electrical means including biasing means tending to constantly cause an electric current to flow through said wires so as to normally constantly heat said thermal expansion wires and maintain said tool at a fixed datum position and booster means for increasing and decreasing said flow and causing movement of said movable support and said micro-tool, readily operable control means operatively connected with said booster means and arranged to variably control the amount of electrical current being supplied to said thermal expansion wires and travel of said tool within its travel range, and travel ratio adjustment means connected to said electrical means for varying the current therein to control the size of said travel range, whereby said travel range may be readily selected to agree with the magnifying power of said instrument, and whereby the increments of fore and aft movement of said tool within the selected range and in said predetermined direction may be readily and accurately separately controlled within the range selected.

8. A micromanipulator for use with a microscope or like optical instrument having an object field, said micromanipulator comprising a micromanipulator head arranged to be supported in a normally stationary spaced relation relative to said object field during use thereof and having a movable support for supporting a micro-tool and for accurately moving said tool variable amounts in a plurality of different predetermined directions within said object field, thermal expansion means conencting said movable support to the head, said thermal expansion means comprising a plurality of pairs of electrically conductive wires arranged as separately operable units, each pair of expansion wires extending in a different predetermined direction from said movable support and being adapted when subjected to increases and decreases in temperature to expand and contract and thereby move said movable support and micro-tool respectively forwardly and rearwardly in said predetermined directions, electrical means connected with each pair of wires so as to complete an electrical circuit therethrough, said electrical means including biasing means tending to constantly cause an electric current to flow through said wires so as to normally constantly heat said wires and maintain said tool at a fixed datum position and booster means for increasing and decreasing said flow and causing movement of said movable support and said micro-tool, readily operable control means operatively connected with said booster means and arranged to separately variably control the amounts of electrical current being supplied to said pairs of wires and the travel of said tool within its travel range, and travel ratio adjustment means connected to said electrical means for varying the current therein to control the size of said travel range, whereby said travel range may be readily selected to agree with the magnifying power of said instrument, and whereby the increments of fore and aft movement of said tool within the selected range and in said predetermined direction may be readily and accurately separately controlled.

9. A micromanipulator for use with a microscope or like optical instrument having an object field, said micromanipulator comprising a micromanipulator head arranged to be supported in a normally stationary spaced relation relative to said object field during use thereof, and having a movable support for supporting a micro-tool and for accurately moving said tool variable amounts in a plurality of different predetermined directions within said object field, thermal expansion means connecting said movable support to the head, said thermal expansion means comprising a plurality of pairs of electrically conductive wires arranged as separately operable units, each pair of expansion wires extending in a different predetermined direction from said movable support and being adapted when subjected to increases and decreases in temperature to expand and contract and thereby move said movable support and microtool respectively forwardly and rearwardly in said predetermined directions, electrical means connected with each pair of wires so as to complete an electrical circuit therethrough for heating same and causing movement of said movable support and microtool, readily operable control means operatively connected with said electrical means and arranged to separately variably control the amounts of electrical current being supplied to said pairs of wires, whereby the amount of movement of said micro-tool forwardly and rearwardly in each of said predetermined directions may be accurately controlled, and shiftable means connected to said electrical means for changing the flow of current therein so as to over-ride the control means for one pair of expansion wires and retract said tool vertically from said object field during relative relocation therebetween.

10. A micromanipulator for use with a microscope or like optical instrument having an object field, said micromanipulator comprising a pair of heads each arranged to be supported in a normally stationary spaced relation relative to said object field during use thereof, a movable support carried by each of said heads for supporting a micro-tool thereon and the effective tip portions of said micro-tools within the object field of said optical instrument, thermal expansion wire means connecting said movable supports to the respective heads and arranged to effectively expand and contract when subjected to changes in temperature, whereby said movable supports and micro-tools attached thereto may be moved in a predetermined direction with respect to said object field, electrical means connected with said wire means so as to complete an electrical circuit therethrough for heating said wire means and moving the movable supports and micro-tools controlled amounts in accordance with the amounts of electric current supplied to said wire means and consequent expansion and contraction thereof, and a pair of readily operable control means located at opposite side of said instrument and operatively connected with said electrical means for operating the head located at the opposite side of said instrument and controlling the amounts of electric current being supplied to the wire means thereof.

11. A micromanipulator for use with a microscope or like optical instrument having an object field, said micromanipulator comprising a first micromanipulator head and a second micromanipulator head arranged to be supported in a normally stationary spaced relation relative to said object field during use thereof, each of said heads having a movable support for supporting a micro-tool and for accurately moving the tool variable amounts in a plurality of different predetermined directions within said object field, thermal expansion means connecting each of said movable supports to its respective manipulator head, each of said thermal expansion means comprising a plurality of pairs of electrically conductive wires arranged as separately operable units, each pair of expansion wires associated with a movable support extending in a different predetermined direction therefrom and being adapted when subjected to increases and decreases in temperature to expand and contract and thereby move the movable support and the micro-tool associated therewith respectively forwardly and rearwardly in its predetermined direction, electrical means including a selector switch adapted to be selectively connected with the pairs of wires of both of said micromanipulator heads so as to complete an electrical circuit therethrough for heating same and causing movement of the associated movable support and micro-tool, and readily operable control means operatively connected with said electrical means and arranged to separately variably control the amounts of electrical current being supplied to said pairs of wires of the selected micromanipulator head, whereby the amount of movement of the selected micro-tool forwardly and rearwardly in its predetermined directions may be accurately controlled.

12. A manipulator for use with an instrument having an object area, said manipulator comprising a manipulator head arranged to be supported in a normally stationary spaced relation relative to said object area during use thereof and having a movable support for positioning a tool and for accurately moving a portion thereof variable amounts in a predetermined direction relative to said object area, relatively long thin electrically-conductive resistance means connected at one end to said movable support and at the other end to said normally stationary head in such a manner as to position said movable support in an appreciably spaced relation relative to said head, said resistance means being arranged when subjected to increases and decreases in the temperature thereof to expand and contract in length and accordingly move said movable support and tool forwardly and rearwardly in said predetermined direction, electrical means connected to the opposite ends of said resistance means so as to complete an electric circuit therethrough for heating said resistance means and causing expansion thereof and movement of said movable support and said tool, and readily operable control means operatively connected with said electrical means and arranged to variably control the amount of electrical current being supplied to said resistance means, whereby the amount of movement of said tool forwardly and rearwardly in said predetermined direction may be readily and accurately controlled.

13. A micro-manipulator for use with a microscope or like optical instrument having an object field, said micromanipulator comprising a manipulator head arranged to be supported in a normally stationary spaced relation relative to said object field during use thereof and having a movable support for supporting a micro-tool and for accurately moving same variable small amounts in a predetermined direction relative to said object field, a pair of relatively long thin electrically-conductive resistance wires each connected at one end to said movable support and at the other end to said normally stationary head in such a manner as to position said movable support in an appreciably spaced relation relative to said head, said resistance wires being arranged when subjected to increases and decreases in the temperature thereof to expand and contract in length and correspondingly move said movable support and micro-tool small amounts forwardly and rearwardly in said predetermined direction, electrical means connected to the opposite ends of said resistance wires so as to complete an electrical circuit through said wires for heating said wires and causing movement of said movable support and said micro-tool, readily operable control means operatively connected with said electrical means and arranged to variably control the amount of electrical current being supplied to said wires, whereby the amount of movement of said micro-tool forwardly and rearwardly in said predetermined direction may be readily and accurately controlled.

14. A micro-manipulator for use with a microscope or like optical instrument having an object field, said micro-manipulator comprising a micro-tool supporting head, base means for supporting said head in a normally stationary spaced relation relative to said object field during use thereof, a movable support carried by said head for receiving and supporting a micro-tool thereon and for accurately moving the operative end portion of said micro-tool relative to said object field manual adjustment means for moving said head relative to said base means to provide coarse adjustment of said micro-tool with respect to said object field, means within said head for effecting movement of said movable support and fine adjustment of said micro-tool carried thereby with respect to said object field, said fine adjustment means comprising a pair of relatively long thin electrically-conductive resistance wires each connected at one end to said movable support and at the other end to said head in such a manner as to position said movable support in an appreciably spaced relation relative to said head, said wires being arranged when subjected to increases and decreases in temperature to expand and contract in length and correspondingly move said movable support and the micro-tool carried thereby forwardly and rearwardly variable small amounts in a predetermined direction with respect to said object field, electrical means connected to the opposite ends of said resistance wires so as to complete an electrical circuit therethrough for heating said resistance wires and causing movement of said movable support and micro-tool in accordance with the amount of electrical current passing through said resistance wires, and readily operable control means operatively connected with said electrical means and arranged to variably control the amount of electrical current being supplied to said resistance wires, whereby said head and said micro-tool may be readily adjusted into an operative position relative to said object field by said coarse adjustment means and thereafter said micro-tool may be readily and accurately moved small controlled amounts by said fine adjustment means.

15. A micro-manipulator for use with a microscope or like optical instrument having a stage for supporting a microscope slide providing an object field, said micromanipulator comprising a base, a manipulator head arranged to be supported in a normally stationary spaced relation relative to said stage, slide and object field during use thereof, rail-like guide means on said base for guiding said microscope, stage and slide for precise sliding movement in a direction toward and away from said head, said head having a movable support for supporting a micro-tool and for accurately moving same variable amounts in a predetermined direction relative to said object field, relatively long thin electrically-conductive resistance means connected at one end to said movable support and at the other end to said normally stationary head in such a manner as to position said movable support in an appreciably spaced relation relative to said head, said resistance means being arranged when subjected to increases and decreases in the temperature thereof to expand and contract and correspondingly move said movable support and micro-tool forwardly and rearwardly in said predetermined direction, electrical means connected to the opposite ends of said electrical resistance means so as to complete an electrical circuit therethrough for heating said resistance means and causing expansion thereof and movement of said movable support and said micro-tool, readily operable control means operatively connected to said electrical means and arranged to variably control the amount of electrical current being supplied to said resistance means, whereby the amount of movement of said micro-tool forwardly and rearwardly in said predetermined direction may be accurately controlled, said rail-like means serving to accurately guide said stage and microscope slide thereon into and out of operative position relative to said micro-tool and said head without necessitating a material change in the adjusted position of said micro-tool and without danger of having said stage or slide strike or injure said micro-tool when said microscope is retracted for interchanging of slides or the like and thereafter moved back into operative position.

16. A manipulator for moving an element relative to an object and comprising a manipulator head arranged to be disposed in a normally stationary operative position relative to said object during use thereof, said manipulator head having a movable support carried thereby for accurately actuating said element relative to said object variable amounts along a predetermined path, relatively long thin electrically-conductive resistance means connected at one end to said movable support and at the other end to said head in such a manner as to position said movable support in an appreciably spaced relation relative to said head, said resistance means being arranged when subjected to increases and decreases in the temperature thereof to expand and contract in length and thereby move said element relative to said object in opposite directions along said predetermined path, electrical means connected to the opposite ends of said resistance means so as to complete an electrical circuit therethrough for heating said resistance means and causing movement of said movable support and said element, and readily operable control means operatively connected with said electrical means and arranged to variably control the amount of electrical current being supplied to said resistance means, whereby the amount of movement of said movable support forwardly and rearwardly along said predetermined path may be accurately controlled.

References Cited in the file of this patent
UNITED STATES PATENTS

| | | |
|---|---|---|
| 1,281,035 | Levy | Oct. 8, 1918 |
| 1,987,733 | Fonbrune | Jan. 15, 1935 |
| 2,651,236 | Kahler | Sept. 8, 1953 |
| 2,753,761 | Hillier | July 10, 1956 |